(12) United States Patent  
Bailey et al.

(10) Patent No.: US 9,161,499 B2  
(45) Date of Patent: Oct. 20, 2015

(54) WIRELESS IRRIGATION CONTROL DEVICE AND RELATED METHOD

(75) Inventors: David Franklin Bailey, Riverview, FL (US); Ronald Willard Mickels, Chula Vista, CA (US); Mark Murphy Ensworth, Orange, CA (US); Thomas Anthony Antonucci, Azusa, CA (US)

(73) Assignee: Rain Bird Corporation, Azusa, CA (US)

( * ) Notice: Subject to any disclaimer, the term of this patent is extended or adjusted under 35 U.S.C. 154(b) by 1783 days.

(21) Appl. No.: 12/173,765

(22) Filed: Jul. 15, 2008

(65) Prior Publication Data

US 2008/0275595 A1 Nov. 6, 2008

Related U.S. Application Data

(63) Continuation of application No. 11/674,258, filed on Feb. 13, 2007, now Pat. No. 7,400,944, which is a continuation of application No. 10/922,573, filed on Aug. 20, 2004, now Pat. No. 7,359,769, which is a continuation-in-part of application No. 10/029,726, filed on Dec. 20, 2001, now Pat. No. 6,782,310.

(51) Int. Cl.  
*G05D 7/00* (2006.01)  
*A01G 25/16* (2006.01)

(52) U.S. Cl.  
CPC .............. *A01G 25/167* (2013.01); *A01G 25/16* (2013.01)

(58) Field of Classification Search  
USPC ........................................................ 700/284  
See application file for complete search history.

(56) References Cited

U.S. PATENT DOCUMENTS

| 3,726,477 | A |   | 4/1973  | Shapiro |
|-----------|---|---|---------|---------|
| 3,747,620 | A |   | 7/1973  | Kah, Jr. |
| 4,007,458 | A | * | 2/1977  | Hollabaugh ............. 340/310.11 |
| 4,185,650 | A |   | 1/1980  | Neves et al. |
| 4,209,131 | A |   | 6/1980  | Barash et al. |
| 4,423,484 | A |   | 12/1983 | Hamilton |
| 4,626,984 | A |   | 12/1986 | Unruh et al. |
| 4,684,920 | A |   | 8/1987  | Reiter |
| 4,760,547 | A |   | 7/1988  | Duxbury |
| 4,838,310 | A |   | 6/1989  | Scott et al. |

(Continued)

OTHER PUBLICATIONS

U.S. Appl. No. 10/922,573; Notice of Allowance mailed Nov. 20, 2007.

(Continued)

*Primary Examiner* — Carlos Ortiz Rodriguez  
(74) *Attorney, Agent, or Firm* — Fitch, Even, Tabin & Flannery LLP

(57) ABSTRACT

Embodiments of the invention provide wireless irrigation control systems and related methods. In one embodiment, the invention may be characterized as a wireless irrigation control system comprising: at least one water flow control device; a watertight housing; and a wireless receiver within the watertight housing and adapted to receive irrigation schedule related signals. The system also includes a memory within the watertight housing and adapted to store an irrigation schedule established or modified by the received irrigation schedule related signals; and a controller within the watertight housing and coupled to the memory, the controller adapted to execute the irrigation schedule to cause the water flow control device to operate according to the irrigation schedule. Additionally, a power supply is within the watertight housing and adapted to supply power to at least the controller.

30 Claims, 8 Drawing Sheets

(56) References Cited

U.S. PATENT DOCUMENTS

| | | |
|---|---|---|
| 4,852,802 A | 8/1989 | Iggulden et al. |
| 4,962,522 A | 10/1990 | Marian |
| 5,009,368 A * | 4/1991 | Streck et al. ............ 239/70 |
| 5,074,468 A | 12/1991 | Yamamoto et al. |
| 5,173,855 A | 12/1992 | Nielsen et al. |
| 5,206,857 A | 4/1993 | Farleigh |
| 5,208,855 A | 5/1993 | Marian |
| 5,251,153 A | 10/1993 | Nielsen et al. |
| 5,333,785 A | 8/1994 | Dodds et al. |
| 5,427,350 A | 6/1995 | Rinkewich |
| 5,621,730 A | 4/1997 | Kelley |
| 5,625,569 A | 4/1997 | Trimmer et al. |
| 5,661,349 A | 8/1997 | Luck |
| 5,748,466 A | 5/1998 | McGivern et al. |
| 5,760,706 A | 6/1998 | Kiss |
| 5,813,655 A | 9/1998 | Pinchott et al. |
| 5,870,302 A | 2/1999 | Oliver |
| 5,921,280 A | 7/1999 | Ericksen et al. |
| 5,963,650 A | 10/1999 | Simionescu et al. |
| 6,088,621 A | 7/2000 | Woytowitz et al. |
| 6,236,332 B1 | 5/2001 | Conkright et al. |
| 6,335,855 B1 | 1/2002 | Alexanian et al. |
| 6,782,310 B2 | 8/2004 | Bailey et al. |
| 6,782,311 B2 | 8/2004 | Barlow et al. |
| 6,823,239 B2 | 11/2004 | Sieminski |
| 7,085,595 B2 | 8/2006 | Kitchin |
| 7,340,500 B2 * | 3/2008 | Traversat et al. ............ 709/201 |
| 7,359,769 B2 | 4/2008 | Bailey et al. |
| 7,400,944 B2 | 7/2008 | Bailey et al. |
| 2002/0105437 A1 | 8/2002 | Pollak et al. |
| 2003/0067889 A1 | 4/2003 | Petite |
| 2003/0120393 A1 | 6/2003 | Bailey et al. |
| 2005/0192710 A1 | 9/2005 | Thornton et al. |

OTHER PUBLICATIONS

U.S. Appl. No. 10/922,573; Office Action mailed Mar. 15, 2006.
U.S. Appl. No. 10/922,573; Office Action mailed May 2, 2007.
U.S. Appl. No. 10/922,573; Office Action mailed Dec. 4, 2006.
U.S. Appl. No. 11/674,258; Notice of Allowance mailed Mar. 11, 2008.
U.S. Appl. No. 11/674,258; Office Action mailed Jul. 19, 2007.

* cited by examiner

WIRELESS IRRIGATION CONTROL DEVICE AND RELATED METHOD

CROSS-REFERENCE TO RELATED APPLICATION

This is a Continuation of prior patent application Ser. No. 11/674,258, filed Feb. 13, 2007, which is a Continuation of prior patent application Ser. No. 10/922,573, filed Aug. 20, 2004, now issued as U.S. Pat. No. 7,359,769, which is a Continuation-In-Part of prior patent application Ser. No. 10/029,726, filed Dec. 20, 2001, and now issued as U.S. Pat. No. 6,782,310. All of these prior applications are hereby incorporated by reference in their entirety.

BACKGROUND OF THE INVENTION

This invention relates generally to automated irrigation systems and, more particularly, to systems for the control of irrigation devices, such as valves, pumps and rotors. Water valves and pumps are used to control the flow of irrigation water through a variety of water dispensing devices, including rotors. Rotors irrigate by throwing a jet or spray of water that is rotated about a generally vertical axis. Rotors are typically enclosed in a protective housing, and a rotating nozzle pops up from the top of the housing during desired irrigation times. Rotors are supplied with water from water supply lines that are usually installed below ground and are typically actuated by electric solenoid-controlled valves. Rotation of the nozzle may be effected by a self-contained water turbine and a reduction gear mechanism, or the nozzle may be of the impact-arm type, which utilizes the angular momentum of a spring-loaded oscillating arm to rotate the nozzle in small angular increments through a desired arc, or continuously through a full circle of rotation.

Valves, pumps and rotors are used in a wide variety of irrigation applications, from residential and commercial landscapes to golf course and agricultural irrigation. The application to golf course irrigation is mentioned here by way of example, but as the description of the invention proceeds it will be understood that the principles described are equally applicable to other types irrigation environments. A common feature of underground irrigation systems is that control wires must be run from a controller to each solenoid valve and pump that controls the flow of water to a sprinkler or group of sprinklers. Control wires to the valves, pumps and rotors are typically buried below ground, often in the same trenches used to run supply pipes to the valves. Control systems vary from simple multi-station timers to complex computer-based controllers.

The advantages of a wireless rotor, using a battery to control the solenoid valve, have been recognized by others. For example, U.S. Pat. No. 4,626,984 to Unruh, U.S. Pat. No. 5,813,655 to Pinchott et al., and U.S. Pat. No. 4,962,522 to Marian, broadly suggest some features of a wireless rotor. None of these patents, however, suggest all the features of the present invention, which are summarized below.

BRIEF SUMMARY OF THE INVENTION

Embodiments of the invention provide wireless irrigation control systems and related methods. In one embodiment, the invention may be characterized as a wireless irrigation control system comprising: at least one water flow control device; a watertight housing; and a wireless receiver within the watertight housing and adapted to receive irrigation schedule related signals. The system also includes a memory within the watertight housing and adapted to store an irrigation schedule established or modified by the received irrigation schedule related signals; and a controller within the watertight housing and coupled to the memory, the controller adapted to execute the irrigation schedule to cause the water flow control device to operate according to the irrigation schedule. Additionally, a power supply is within the watertight housing and adapted to supply power to at least the controller.

In another embodiment, the invention may be characterized as a method for controlling a plurality of wireless irrigation control devices, the method comprising: organizing the plurality of wireless irrigation control devices into multiple groups; receiving a broadcast signal at each control device, the broadcast signal containing content selectively applicable to a single wireless irrigation control device, to more than one wireless irrigation control device, and to the wireless irrigation control devices of one or more of the multiple groups; decoding the received broadcast signal and confirming that it applies to a particular irrigation control device or a group to which the particular irrigation control device belongs; storing and updating at least one watering schedule in a memory module based on data received from time to time, and decoded in the preceding step; and generating signals based on the stored watering schedule to control a water control device in accordance with the stored watering schedule.

In another embodiment, the invention may be characterized as a method for controlling a plurality of wireless irrigation control devices, the method comprising: organizing a plurality of wireless irrigation control devices into one or more groups, the groups organized according to similarity in irrigation schedules such that the wireless irrigation control devices of each group operate according to substantially the same schedule; receiving a broadcast signal at each control device; decoding the received broadcast signal and confirming which control devices the broadcast signals are directed to; updating at least one watering schedule at the controller based on data received from the broadcast signals; and operating a water control device in accordance with the stored watering schedule.

In a further embodiment, the invention may be characterized as a wireless irrigation control device, comprising: a water flow control device; a controller coupled to the water flow control device and capable of responding to and storing wireless transmitted control commands; a battery power supply also contained within the housing, to supply power to the controller and to the water control device; wherein the controller processes control commands received at the water flow control device; and wherein the control commands include a command to activate a power saving schedule that shuts down portions of the controller's operation according to the power saving schedule, thereby reducing demand on the battery power supply.

In another embodiment, the invention may be characterized as a method for controlling a wireless irrigation control device, the method comprising: receiving broadcast signals; decoding the received broadcast signals and confirming that they apply to the particular irrigation control device; storing and updating at least one watering schedule in a memory module based on data received from time to time, and decoded in the preceding step; generating signals to control a water control device in accordance with the watering schedule; and activating a power saving schedule adapted to shut down portions of the wireless irrigation control device according to the power saving schedule in response to a signal received and decoded in the decoding step.

Some embodiments of the present invention reside in a wireless irrigation control device. Briefly, and in general terms, the wireless irrigation control device of one embodiment comprises a water control device, which may be a rotor, a valve or a pump, and a controller coupled to the water flow control device. The controller includes a housing, an antenna integrated into the housing and capable of receiving radio-frequency (RF) signals, a microcontroller contained within the housing and coupled to receive and process signals from the antenna, and a memory module for storing watering schedules established or modified by signals received through the antenna. The wireless irrigation control device also includes a battery power supply also contained within the housing, to supply power to the microcontroller and to the water control device. Preferably, the wireless irrigation control device further comprises a battery charge generator integrated into the controller housing and coupled to the battery power supply. The battery charge generator may be a solar panel, a water turbine or any other device for recharging the battery power supply.

Another aspect of one embodiment of the invention includes a magnetic proximity switch installed in the controller housing and coupled to the microcontroller. The magnetic proximity switch is configured to perform a function such as resetting the microcontroller, initiating a desired irrigation program sequence, or initiating a secured irrigation program sequence to allow system initialization.

Preferably, the controller of some embodiments has RF reception capability to process both short-range signals transmitted from a location near the irrigation control device and longer-range signals transmitted through a public broadcast system. The controller may receive short-range and longer-range RF signals through separate receivers operating in parallel at different frequencies, or may receive short-range and longer-range RF signals through a single receiver employing time-division multiplexing.

In accordance with another aspect of some embodiments of the invention, the microcontroller includes means for processing received signals indicative of real-time control commands directed to the water flow control device. These control commands may be signals for scheduling ON and OFF times for the water flow control device, or for setting a real-time clock based on the received signals, such as for making an adjustment for latency of transmission through a public broadcasting system. The means for processing received signals may also include means for adjusting irrigation control commands and sequences for the water flow control device.

In accordance with another aspect of some embodiments of the invention, the wireless irrigation control device further includes a visual status indicator coupled to the controller and integrated into the housing. The visual status indicator is indicative of conditions such as battery condition, receipt of a control signal by the antenna, or fault conditions detected in the controller.

In one embodiment, the present invention may also be defined in terms of a method for controlling a wireless irrigation control device contained in a controller housing. Briefly, the method comprises the steps of receiving broadcast signals through an antenna installed in the housing; decoding the received broadcast signals and confirming that they apply to this particular irrigation control device; based on data received through the antenna from time to time, and decoded in the preceding step, storing and updating at least one watering schedule in a memory module; and based on the stored watering schedule, generating signals to control a water control device in accordance with the watering schedule. The step of generating signals to control a water control device may be directed to any suitable device, such as a rotor, a valve or a pump.

The method of some embodiments of the invention may further comprise recharging, as needed, a battery housed in the rotor body, using a battery charging generator integrated into the rotor body. The method of the invention may further comprise the step of configuring the controller by transmitting signals to it through a magnetic proximity switch, or configuring the controller by transmitting signals to it from a handheld transmitter.

The method of some embodiments of the invention may further include the step of verifying that command signals have been transmitted to the wireless irrigation control device by receiving the same signals in a verification receiver. After verifying transmission, the method may further include the steps of determining a transmission latency time from the verifying step, and transmitting a clock adjustment signal to the wireless irrigation control device, to compensate for the determined latency time.

The method of some embodiments of the invention may further comprise the step of displaying a condition of the controller in a display device associated with the controller. The displaying step may include displaying battery condition, displaying receiver status, or displaying a controller fault condition.

It will be appreciated from the foregoing summary that several embodiments of the present invention represents a significant advance in the field of irrigation control devices. In particular, several embodiments of the invention provide an irrigation control device that requires no outside electrical connections but is still controllable from a remote location. Because the controller, power supply, antenna and recharging generator are all integrated into a conventional rotor body or other housing, some embodiments of the invention may be readily implemented in new irrigation systems or retrofitted in existing ones that were originally hard-wired to a central controller. Other aspects and advantages of preferred embodiments of the invention will become apparent from the following more detailed description, taken in conjunction with the accompanying drawings.

DETAILED DESCRIPTION OF THE PREFERRED EMBODIMENTS

Figure 1:
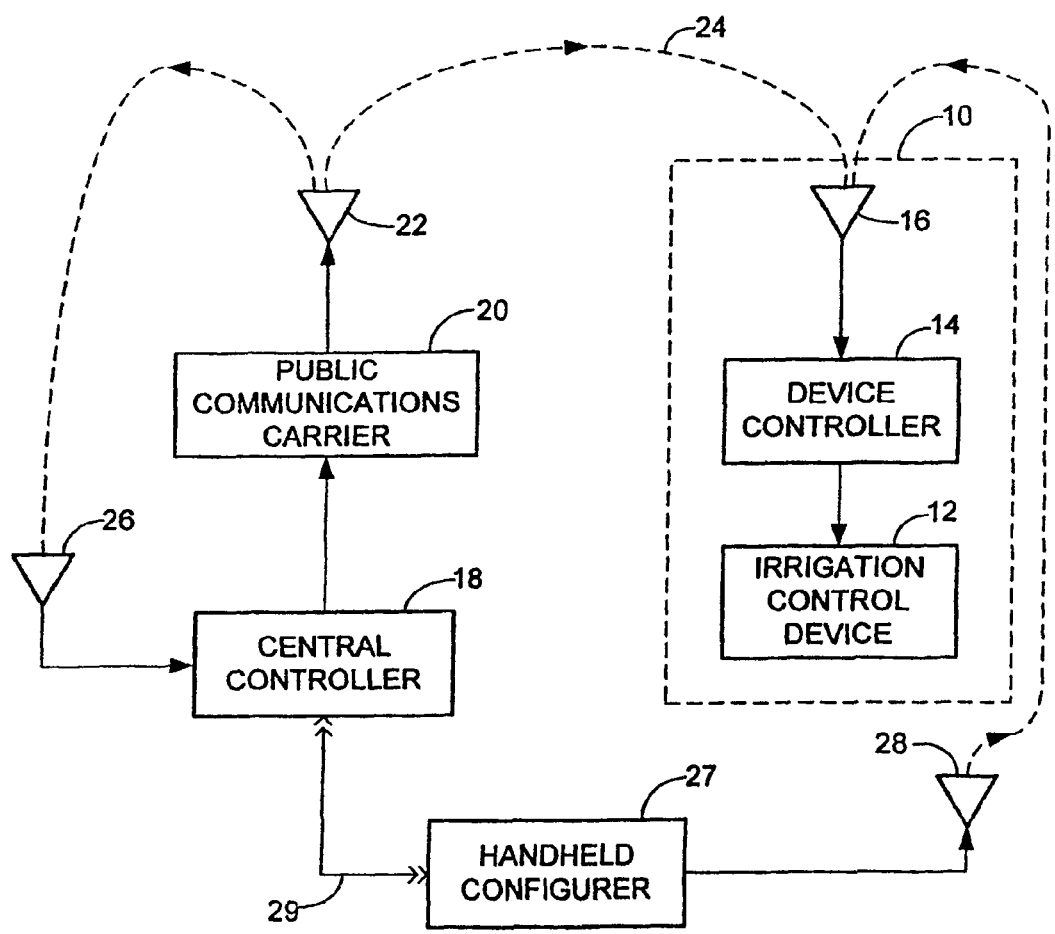
FIG. 1 is a block diagram showing the environment of the invention.

As shown in the drawings for purposes of illustration, there is a wireless irrigation controller that is completely self-contained and controllable from a central site by radio-frequency signals transmitted through a commercial communication network, such as a pager network. More specifically, as shown in FIG. 1, the wireless irrigation controller, shown generally by reference numeral 10, comprises a conventional irrigation control device 12, such as a valve, pump or rotor, a device controller 14, which will be described in more detail below, and a special-purpose antenna 16. A central controller 18, which may take various forms, generates control signals to be transmitted to the wireless controller 10. These signals are first transmitted to a public communications carrier 20, such as a pager service of the type used to transmit messages to portable pager units (not shown). These control signals are transmitted to a public communications carrier 20 using a dial-up modem protocol such as TAP or an internet protocol such as WCTP. The public communications carrier 20 may encode the signals in accordance with a standard pager communications protocol, such as FLEX®, and transmits them from an antenna 22. As indicated by the broken line 24, the signals are transmitted to the wireless controller antenna 16, either directly through the atmosphere or indirectly through one or more relay stations that receive and retransmit the signals. A local encoder/transmitter may be used in place of the public communications carrier 20.

Preferably, the central controller 18 also includes a verification receiver, indicated by antenna 26, which monitors signals transmitted from the antenna 22, to assure proper transmission of the signals to the wireless controller 10. The system also includes a handheld configurer 27, which is a portable device with its own antenna 28. The configurer 27 is a capable of performing multiple functions to configure, calibrate and manually control the device controller 14, by transmitting signals through the air to the controller receiver antenna 16. More specifically, the configurer 27 can be used to transmit an initial configuration to the device controller 10 when newly installed. The initial configuration includes a unique device address and an operating frequency. After installation of the device controller 10, the configurer 27 may be used to transmit calibration data to account for clock inaccuracies, to transmit or modify schedules of operation, and to manually turn the irrigation control device 12 on or off. The handheld configurer 27 may also be connected by a cable 29 to the central controller 18, to ensure that device operating schedules and other data stored in the configurer are synchronized with similar data stored in the central controller.

Figure 2:
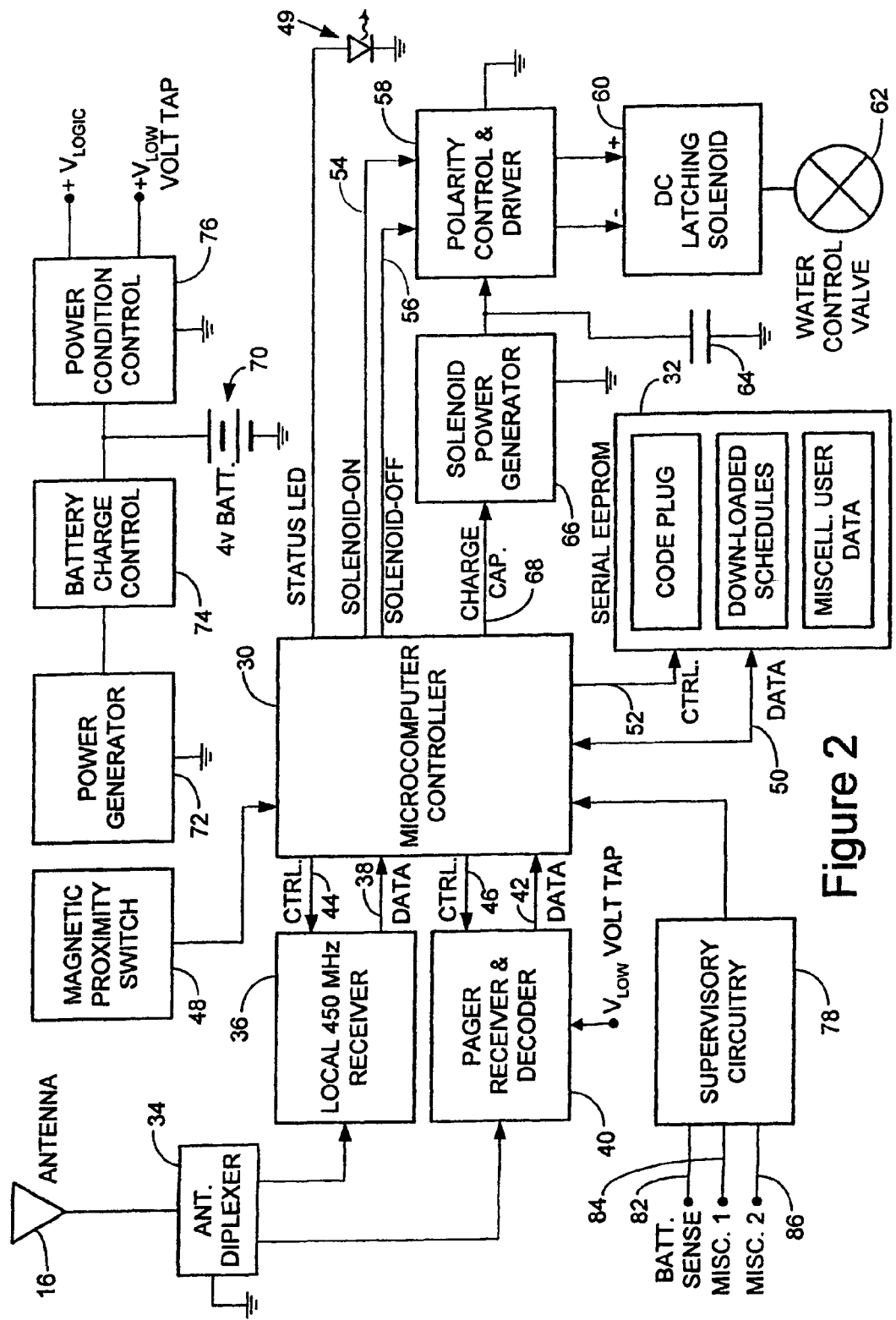
FIG. 2 is block diagram of a wireless controller in accordance with the present invention.

FIG. 2 depicts the principal components of the device controller 14. The controller 14 includes a microcomputer controller 30 and a memory module 32 in which are stored down-loaded watering schedules for the device 12, miscellaneous user data and microcomputer code. The microcomputer 30 may be, for example, the TLCS-870/C eight-bit microcontroller manufactured by Toshiba America Electronic Components, Inc. Signals from the antenna 16 are first processed by an antenna diplexer 34, which separates two types of received signals: those received from the public communications carrier 20; and locally transmitted signals at some convenient frequency, such as 450 MHz (megahertz). The latter signals are processed by a local receiver 36 and passed to the microcomputer 30 over line 38. These signals may be used to control the rotor 12 by means of the handheld configurer 27 carried by maintenance personnel near the device. Signals of the pager type are processed by a pager receiver and decoder 40 and passed to the microcomputer 30 over line 42. As indicated by lines 44 and 46, the microcomputer 30 sends control signals to the local receiver 36 and the pager receiver and decoder 40, respectively, to control operation of these components.

The microcomputer 30 has diagnostic processing to check the memories 32 and input and output interfaces. A magnetic proximity switch 48 operates to reset the microcomputer 30 and allows for operation in a secured configuration program sequence for a selected period of time after resetting. Therefore, the proximity switch 48 allows an operator to reset the controller 14 to the secured sequence, in the event of a controller malfunction. The microcomputer 30 also controls a light-emitting diode (LED) 49, which is used to indicate controller status and diagnostic information.

The data received through the antenna 16 may be watering schedules, changes in watering schedules, user data, or code corrections to be used by the microcomputer 30. The microcomputer 30 processes the incoming data and makes appropriate changes to the schedules stored in the memory module 32. Data are transmitted to and from the memory module 32 over line 50. Line 52 represents control signals transmitted to the memory module 32 from the microcomputer 30.

Based on the watering schedules stored in the memory module 32, the microcomputer 30 generates rotor valve ON and OFF signals on lines 54 and 56, respectively. These signals are coupled to a polarity control and driver unit 58, which, in turn, is coupled to a DC latching solenoid 60 that controls a water valve 62, if the controller 10 is used to control water flow through a pipe or in a rotor 12. If the controller 10 is used to control a pump, the solenoid 60 or an equivalent electrical relay, is used to actuate the pump. Operating power for the solenoid 60 comes from a capacitor 64, which is charged from a solenoid power generator 66, the latter being controlled by a charge-capacitor signal on line 68 from the microcomputer 30. The entire controller is powered by a 4-volt rechargeable battery 70. A power generation device 72, such as a solar array, provides recharging power to a battery charge control unit 74 connected to the battery 70. Power from the battery 70 is further conditioned in a power condition control unit 76, which provides voltage taps to power the controller and the solenoid power generator 66.

The controller also includes supervisory circuitry 78 that provides data to the microcomputer 30, over line 80, based on inputs on a battery sense line 82 and at least two other miscellaneous sense lines 84 and 86 that can be used for diagnostic or other purposes, according to a particular application of the controller.

Figure 3:
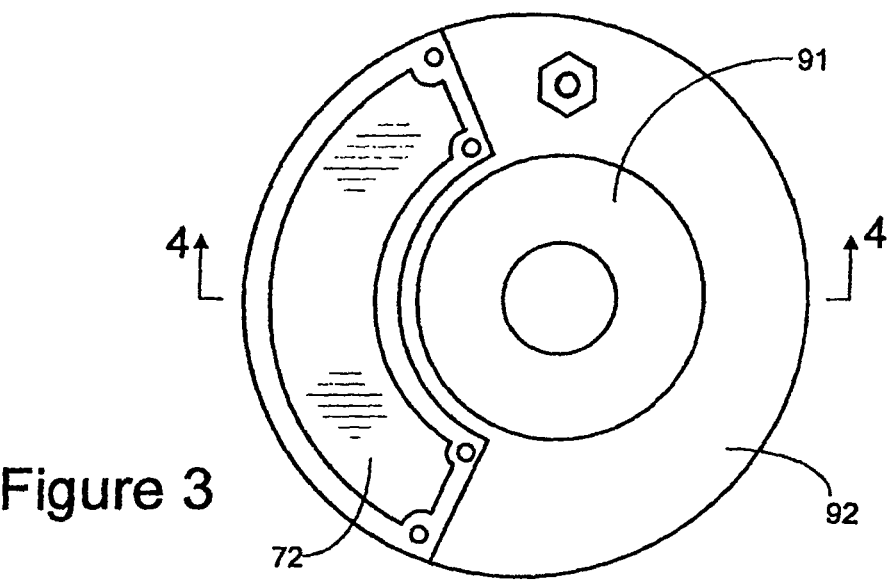
FIG. 3 is a simplified plan view of a wireless rotor in accordance with the invention.
Figure 4:
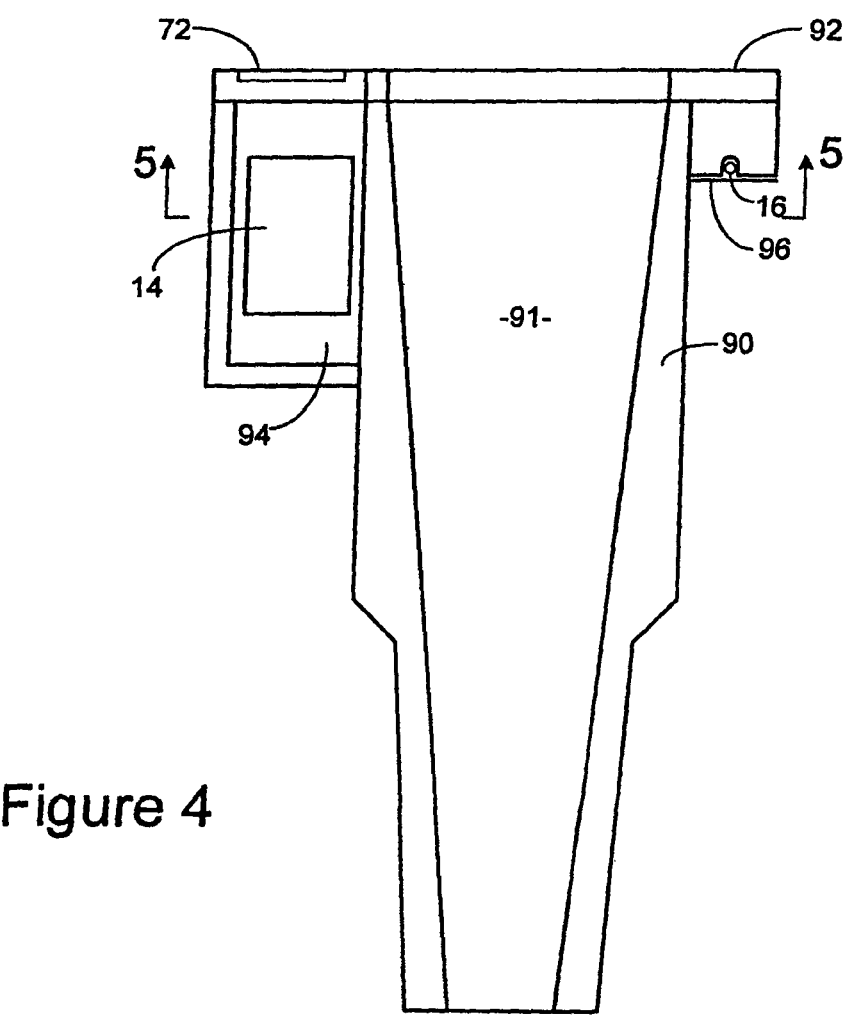
FIG. 4 is a simplified cross-sectional view of the wireless rotor of FIG. 3, taken generally along the line 4-4.
Figure 5:
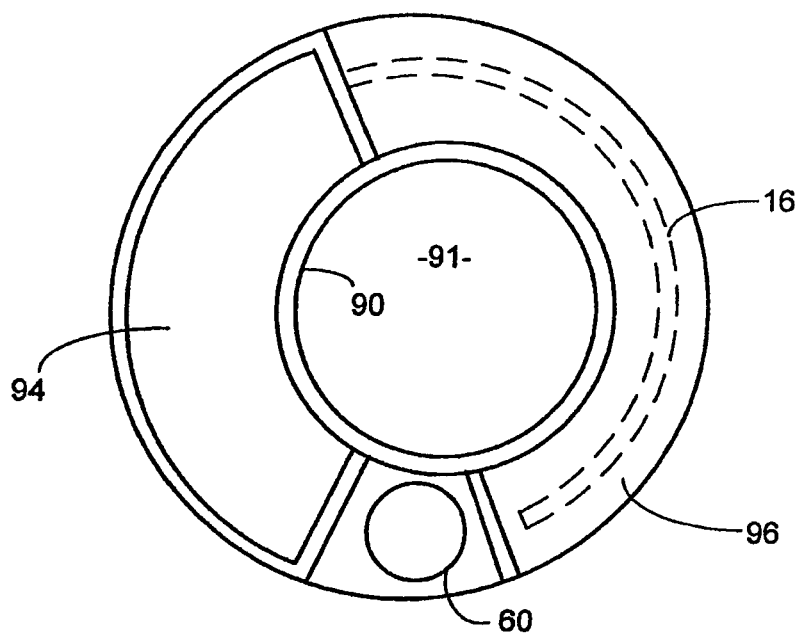
FIG. 5 is another simplified cross-sectional of the wireless rotor, taken generally along the line 5-5 of FIG. 4.

The controller 14, including the power generator 72, in the form of a solar array, and the antenna 16, is enclosed in a conventional irrigation rotor. For example, the rotor may be a gear-driven rotor designated the EAGLE™ by Rain Bird Corporation Azusa, Calif., such as the EAGLE™ 700 Series, 750 Series, 900 Series or 950 Series, a detailed description of which may be obtained from the manufacturer's Web site located at www.rainbird.com. Alternatively, the rotor may be of the impact-arm type. FIGS. 3-5 are simplified views of a rotor body similar to the one used in the EAGLE™ gear-driven rotors. For clarity, the pop-up rotor mechanism itself is omitted from the drawings since it has little relevance to the present invention.

As shown in FIGS. 3 and 4, the rotor 12 has a hollow and generally cylindrical body 90, the interior of which forms a tapered cavity 91 that houses the gear-driven pop-up rotor head (not shown). Integral with the body 90 is a generally annular top 92. In most installations, the top 92 is the only portion of the rotor assembly that is visible above grade level. The lower end portion of the body 90 is coupled to an underground water supply pipe and includes a valve (62, not shown in FIG. 4). When the valve 62 is opened, the rotor head pops up above grade level and the gear-driven mechanism rotates a water jet slowly through a selected azimuth angle. The solar array 72 is installed as part of the top 92. More specifically, the solar array 72 is an annular segment of the top 92 and is recessed into the top in such a way as to present an unbroken, continuous upper surface. Immediately beneath the solar array 72 is a sealed cavity 94 that houses the remaining components of the rotor controller 14.

In the illustrative embodiment, the antenna 16 is an antenna installed beneath the portion of the top 94 that does not include the solar array 72. The position of the antenna 16 can be seen in FIG. 4, and in the upward-looking view of FIG. 5. Positioned immediately beneath the antenna 16 is a ground plane 96, which provides the desired antenna characteristics, such as the ability to operate at or slightly below grade level in a variety of environmental conditions that are typically adverse for antennas.

Communication protocols used between the central controller 18 and the public communications carrier 20, and between the public communications carrier 20 and the wireless rotor 10, are not critical to the invention. For convenience, the second protocol, between the carrier 20 and the wireless rotor 10, should preferably be an industry standard. For example, one of the FLEX® protocols originated by Motorola, Inc. is the industry standard one-way paging protocol in the United States. The protocol for communicating commands to the communications carrier 20 need only be selected to satisfy the requirements of the carrier. The central controller 18 may take the form of a conventional computer or a simpler communication device, or an on-site terminal and associated transmitter.

Communication of commands to the rotor 10 may use any convenient command format. Each rotor 10 will be identified by a unique code, which may be referred to as a passcode. For example, the passcode may be a three-digit numerical code ranging from 000 through 999 to accommodate a system with as many as 1,000 rotors. The command structure encompasses both simple commands and more complex commands, such as entire watering schedules. The simple commands may take the form <passcode><command>. For example, the following simple commands may be used:

<passcode>1
Turn rotor on immediately.
<passcode>0
Turn rotor off immediately.
<passcode>201<DDHHMMSS> Set time of day and day of week.

Other simple commands include unique command codes to: add a time adjustment; clear a watering table; clear one day of a watering table; resume watering from a watering table; suspend watering from a watering table; add an entry to a watering table; modify the watering table on a one-time-only basis; turn rotor on for a specified duration; and setting a real-time clock in the controller.

An inherent difficulty with remote wireless controllers is that there may be a delay or latency time associated with transmitting a control signal from the central controller 18 through the public communications carrier 20 to the various remote controllers. The verification receiver 26 (FIG. 1) allows the latency time to be measured. The central controller 18 can then transmit to the device controller 14 a time correction to compensate for the latency.

More complex data, such as an entire watering table, can be transmitted by first sending a simple command to condition the rotor to receive the data that follows. Conventional data formatting techniques may be employed, such as using special codes as delimiters to separate data records and to end the entire block of data.

Figure 10:
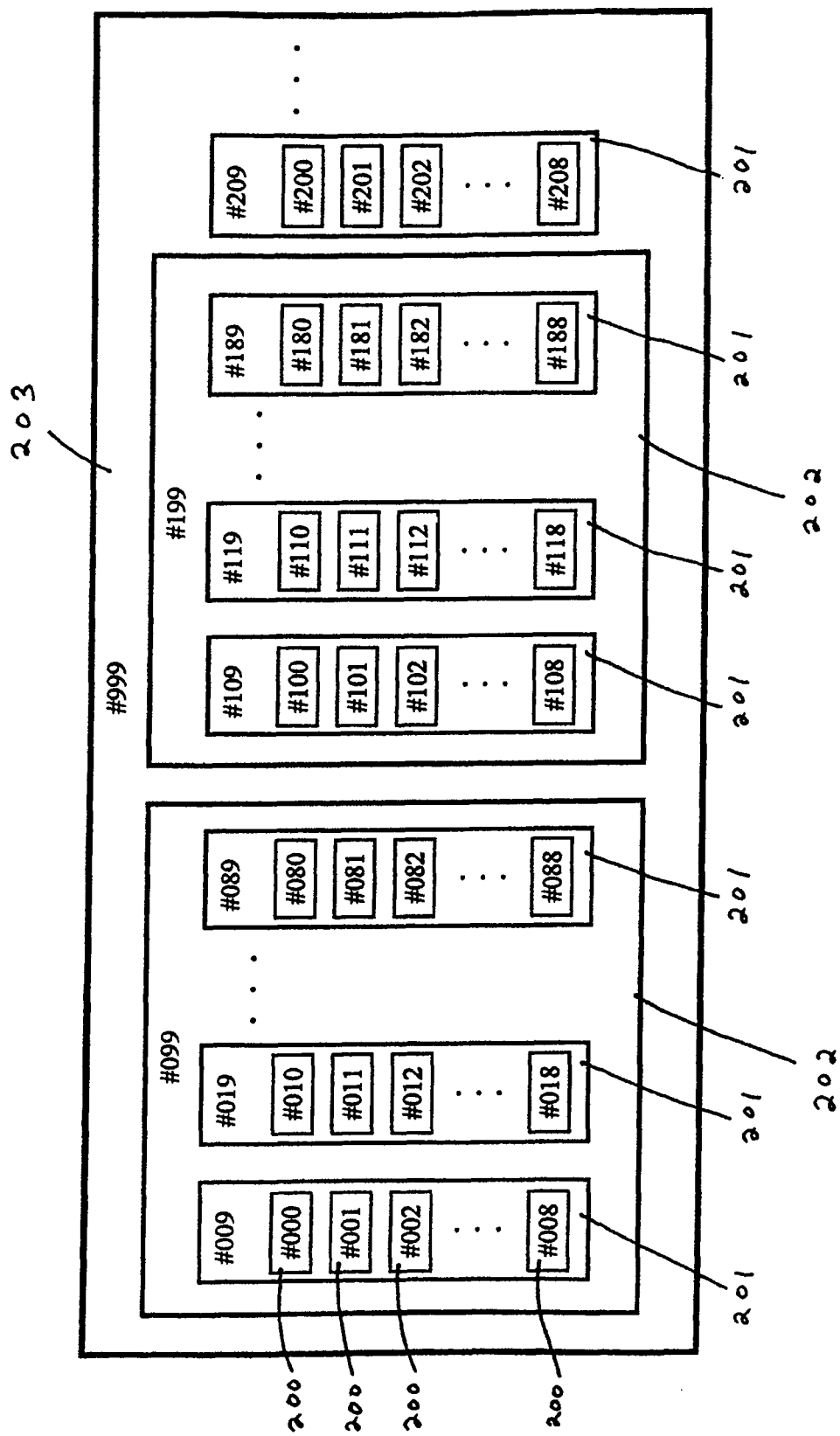
FIG. 10 is a schematic diagram of a method of passcode grouping.

It may be desirable to have the capability to control a group of wireless irrigation control devices with a single command rather than sending commands to each controller in the group individually. For example, one might wish to set the same schedule for all irrigation controllers within a specific zone. A preferred method of sending a single command to a group of controllers is the use of passcode grouping. An example of a preferred method of passcode grouping using nested groups is depicted in FIG. 10. In the example, the passcodes are three-digit numerical codes ranging from #000 to #999. Individual controllers 200 are represented by small rectangles containing single passcodes. Passcodes ending in one or more "9"s are reserved for the purpose of designating groups of controllers.

The lowest level groups 201 consist of up to nine controllers whose passcodes start with the same two digits. Thus, for example, controllers with passcodes from #000 to #008 are in one group 201 and the passcode designating the whole group of controllers is #009. Similarly, controllers with passcodes from #010 to #018 are in another group 201 designated by passcode #019. If a passcode ending in a single "9" is transmitted with a command, all receivers matching the first two digits of the transmitted passcode, i.e., all receivers with passcodes in the same decade as the transmitted code, will respond to the command. Thus, for example, if a command is transmitted with the passcode "119," receivers with passcodes #110 through #118 will respond to the command.

Similarly, second level groups 202 are designated by passcodes ending in two "9"s. If a command is transmitted with a passcode ending in two "9"s, all receivers matching the first digit of the transmitted passcode, i.e., all receivers with passcodes in the same century as the transmitted passcode, will respond to the command. Thus, for example, if a command is transmitted with the passcode "199" all receivers with passcodes #100 through #188 will respond to the command. If a command is transmitted with the passcode "999," the entire collection 203 of receivers respond to the command.

An alternative method of grouping wireless irrigation controllers for command purposes is to have each group of controllers associated with its own passcode. When a command is transmitted with the passcode associated with the group of controllers, each controller in the group responds to the command. Each irrigation controller might be coupled with more than one pager/receiver including one for the passcode associated with each group to which the controller belongs and perhaps one associated with a unique passcode for that individual controller.

Typically, irrigation controllers may be located at some distance from the valve boxes or rotors that they control. For example, on a golf course the controllers might be located in a few groundskeepers' sheds or on a few control pedestals. Thus, there is a design not requiring controllers to be at central locations. Each preferred controller could be located in the valve box, rotor, or other water flow control device that it controls.

It may be desirable to reduce battery usage to preserve battery life during periods when recharging the batteries is not feasible or reliable, such as, for example, during the winter when the control module might be covered with snow, blocking the solar array from receiving energy. A reduction in battery usage could be accomplished through the use of a hibernate command. The hibernate command would instruct the controller to hibernate for periods of time by shutting down energy using portions of the controller's operation according to a hibernate schedule. The receiver in the controller would be activated to listen for broadcast commands only at predetermined intervals according to the hibernate schedule.

It may be desirable to be able to determine which, if any, of the irrigation control devices have batteries in a low charge state. One drawback to using a visual status indicator located on the device is that each device must be visited and visually inspected to determine whether the indicator shows that the batteries in the device are in a low charge state. An alternative to using a low charge indicator on each device is to provide a command to irrigate immediately or at some specified time only if the battery is in a low charge state. If such a command is issued to trigger irrigation at a time when irrigation does not normally occur, those devices containing batteries in a low charge state can be readily identified from a distance by noting which devices irrigate in response to the command.

Figure 6:
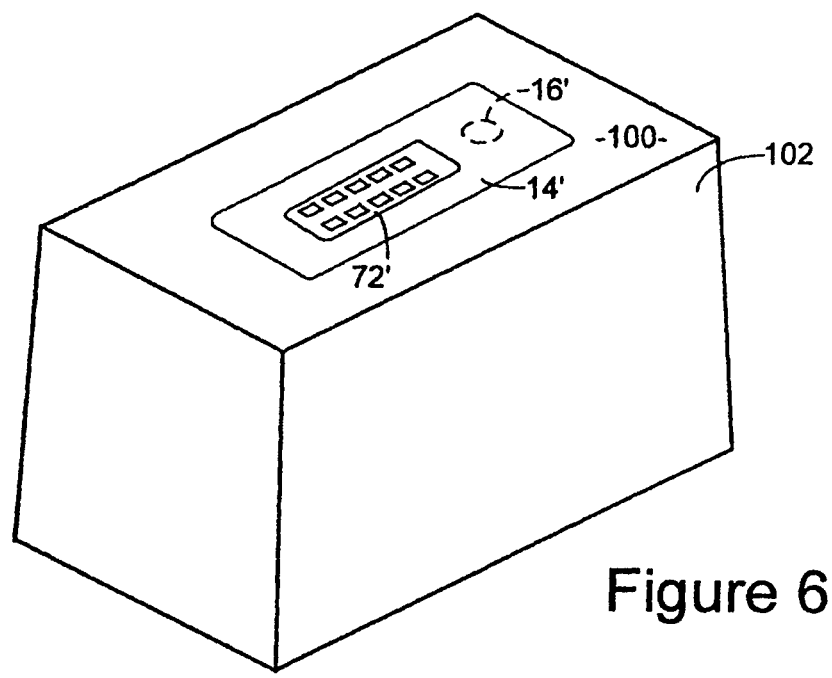
FIG. 6 is a simplified perspective view of a wireless controller in accordance with the invention, installed in a valve box.
Figure 7:
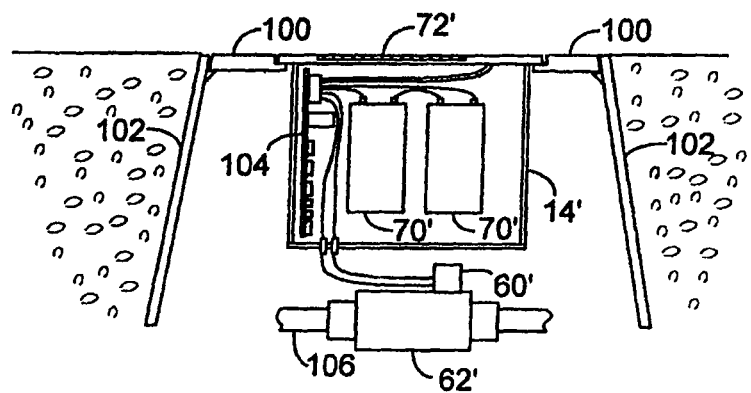
FIG. 7 is a simplified cross-sectional view of the wireless controller and valve box of FIG. 6, as installed in the ground.
Figure 8:
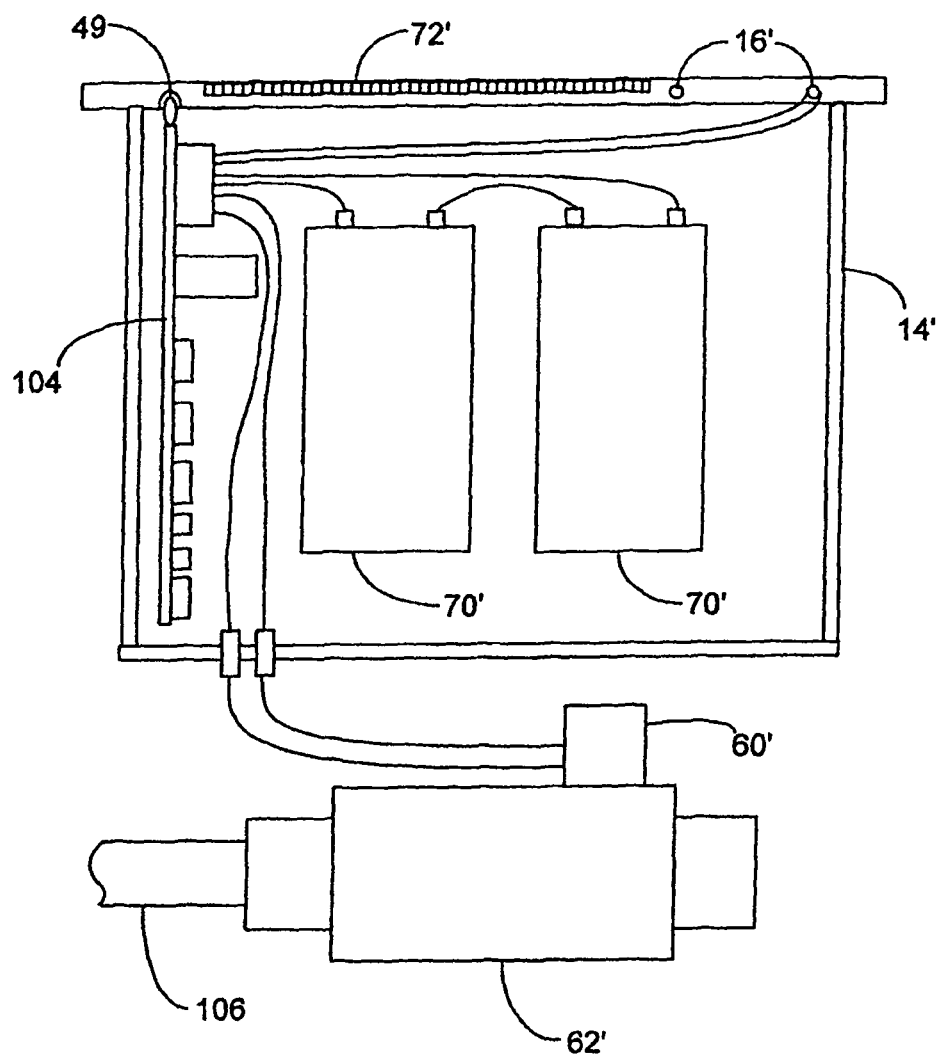
FIG. 8 is a more detailed cross-sectional view of the wireless controller of FIGS. 6 and 7, as installed in a valve box.

It will be readily understood that the foregoing discussion pertaining to wireless control of irrigation rotors also applies to the control of water valves not associated with rotors, and to the control of water pumps. For example, FIG. 6 shows an alternate form of a device controller 14' in accordance with the invention. The device controller 14' includes a solar panel 72' and an antenna 16', and is installed in a lid 100 of a valve box 102, as further illustrated in FIGS. 7 and 8. The controller 14' has all the components described in relation to the controller 14 of FIG. 2, most of which are installed on a circuit board 104. The antenna 16' is a conventional DDRR (directional discontinuity ring radiator) well known in the technical literature. The controller 14' is enclosed in a watertight housing, through which electrical connections are made to a solenoid 60' external to the housing. The solenoid is shown adjacent to a water valve 62' for controlling the flow of water through a pipe 106 beneath the valve box 102.

Figure 9:
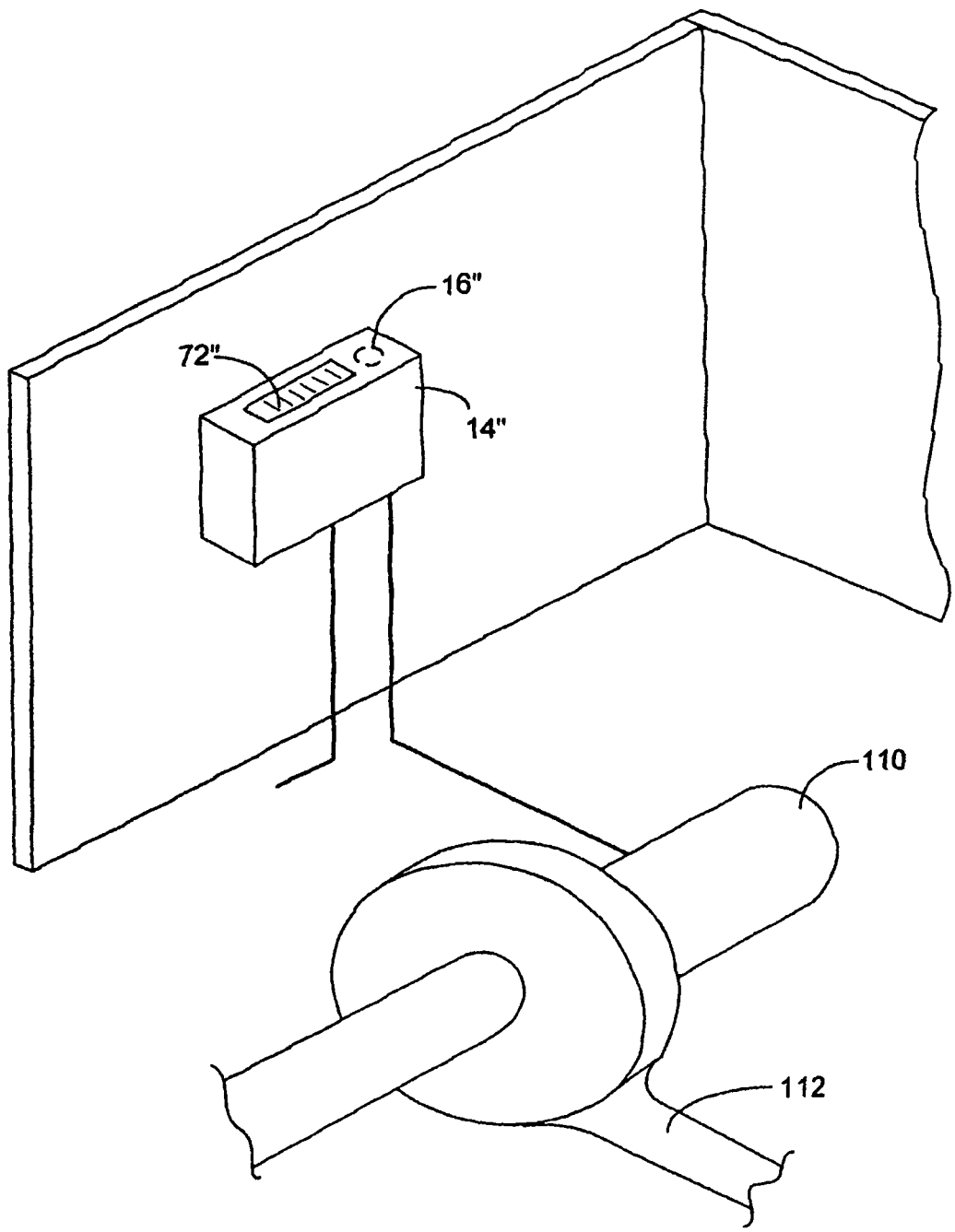
FIG. 9 is a simplified perspective view of a wireless controller in accordance with the invention, as installed to function as a wireless pump start relay.

FIG. 9 depicts a pump controller 14" similar to the controller 14' used for control of the valve 62'. The pump controller 14" includes all the components of the valve controller 14', including a solar panel 72" and DDRR antenna 16". In addition, the pump controller 14" includes a conventional electrical switch (not shown), which may be installed inside or outside the controller housing, and controls the flow of electrical power to a pump 110 coupled to a water pipe 112. The controller 14" controls the electrical switch, either directly or though a suitable relay, and thereby controls the flow of water through the pipe 112 to an irrigation site.

It will be appreciated that although specific embodiments of the invention have been illustrated and described in detail, various modifications may be made without departing from the spirit and scope of the invention. Accordingly, the invention should not be limited except as by the appended claims.

What is claimed is:

1. A wireless irrigation control system, comprising:
   at least one water flow control device;
   a watertight housing;
   a wireless receiver within the watertight housing and adapted to receive irrigation schedule related signals, wherein the wireless receiver is configured to receive the irrigation schedule related signals independent of proximity to a transmitter configured to transmit the irrigation schedule related signals;
   a memory within the watertight housing and adapted to store an irrigation schedule established or modified by the received irrigation schedule related signals;
   a controller within the watertight housing and coupled to the memory, the controller adapted to execute the irrigation schedule to cause the water flow control device to operate according to the irrigation schedule;
   a power supply within the watertight housing and adapted to supply power to at least the controller.

2. The control system of claim 1, wherein the power supply is also configured to supply power to the water flow control device.

3. The control system of claim 1, further comprising a switch sealed within the watertight housing and being actuatable from outside the watertight housing for initializing the controller.

4. The control system of claim 1, wherein the watertight housing is a portion of a valve box.

5. The control system of claim 1, wherein the watertight housing is a portion of a rotor.

6. The control system of claim 1, further comprising at least one solar panel coupled to the power supply.

7. The control system of claim 1, wherein the wireless receiver comprises a wireless paging receiver.

8. The control system of claim 1 further comprising a solenoid coupled to the controller and the at least one water flow control device.

9. The control system of claim 8 further comprising a device housing containing and integrating the watertight housing, the solenoid and the at least one water flow control device together.

10. The control system of claim 1 wherein the irrigation schedule related signals includes the irrigation schedule.

11. The control system of claim 1 wherein the irrigation schedule related signals includes an adjustment to the irrigation schedule.

12. The wireless irrigation control system of claim 1, wherein the wireless receiver is configured to be powered on and capable of receiving the irrigation schedule related signals independent of the proximity to the transmitter.

13. A method for controlling a plurality of wireless irrigation control devices, the method comprising:
   organizing the plurality of wireless irrigation control devices into multiple groups;
   receiving a broadcast signal at each control device, the broadcast signal containing content selectively applicable to a single wireless irrigation control device, to more than one wireless irrigation control device, and to the wireless irrigation control devices of one or more of the multiple groups;
   decoding the received broadcast signal and confirming that it applies to a particular irrigation control device or a group to which the particular irrigation control device belongs;
   storing and updating at least one watering schedule in a memory module based on data received from time to time, and decoded in the preceding step; and
   generating signals based on the stored watering schedule to control a water control device in accordance with the stored watering schedule.

14. The method of claim 13 wherein organizing the plurality of wireless irrigation control devices into the multiple groups further comprises:
   organizing a plurality of wireless irrigation control devices into a collection of nested groups; and
   associating a particular passcode with each group in the collection of nested groups.

15. The method of claim 13 and further comprising:
   associating with each irrigation control device a receiver for each group to which the irrigation control device belongs.

16. The method of claim 13, wherein the step of organizing further includes organizing the control devices into groups based on similarity of irrigation schedules.

17. The method of claim 13 wherein the organizing step comprises organizing the plurality of wireless irrigation control devices into the multiple groups through configuration of the plurality of wireless irrigation control devices.

18. The method of claim 17 wherein the configuration assigns a unique code to each of the plurality of wireless irrigation control devices.

19. The method of claim 17 wherein the configuration is provided by a handheld configurer.

20. The method of claim 13 wherein at least one wireless irrigation control device belongs to multiple groups.

21. The method of claim 13 wherein the receiving step comprises receiving the broadcast signal, the broadcast signal including a command corresponding to, and to be executed by, all wireless irrigation control devices of a particular group.

22. The method of claim 13, further comprising controlling a selected plurality of the multiple groups of control devices, each control device having a unique code, by transmitting a multiple group code associated with the unique codes.

23. The method of claim 13, wherein the broadcast signals transmit a command to turn at least one sprinkler coupled to at least one of the plurality of wireless irrigation control devices on or to turn the at least one sprinkler off.

24. The method of claim 13 further comprising forming a command to be transmitted in the broadcast signal by determining a passcode selectively applicable to a single irrigation control device and a group of irrigation control devices.

25. The method of claim 13 further comprising forming a command to be transmitted by the broadcast signal by determining a passcode of at least one of the multiple groups of irrigation control devices that is related to each passcode of each individual irrigation control device in the at least one of the multiple groups, and including the passcode of the at least one of the multiple groups in the command.

26. The method of claim 25 wherein each individual irrigation control device is configured to be addressed by including the passcode of the individual irrigation control device in the broadcast signal.

27. The method of claim 13 wherein the wireless irrigation control devices are organized into the multiple groups before the broadcast signal is transmitted.

28. The method of claim 27 wherein a determination of which individual wireless irrigation control devices and which of the multiple groups the broadcast signal is to address is determined at a point of transmission for the broadcast signal.

29. A method for controlling a plurality of wireless irrigation control devices, the method comprising:
    organizing a plurality of wireless irrigation control devices into one or more groups, the groups organized according to similarity in irrigation schedules such that the wireless irrigation control devices of each group operate according to substantially the same schedule;
    receiving a broadcast signal at each control device;
    decoding the received broadcast signal and confirming which control devices the broadcast signals are directed to;
    updating at least one irrigation schedule on at least one control device based on data received from the broadcast signals; and
    operating at least one water control device in accordance with the at least one irrigation schedule having been updated.

30. The method of claim 29 wherein the broadcast signal provides at least one command addressed to a single control device.

* * * * *